United States Patent [19]
Gamay et al.

[11] Patent Number: 5,935,634
[45] Date of Patent: Aug. 10, 1999

[54] LOW-WATER ACTIVITY CHEESE AND METHOD OF PREPARATION

[75] Inventors: Aly Y. Gamay, Reston, Va.; Ned R. Schumacher, Greendale, Wis.

[73] Assignee: Gamay Foods, Inc., New Berlin, Wis.

[21] Appl. No.: 08/977,761

[22] Filed: Nov. 25, 1997

[51] Int. Cl.$^6$ .................................................. A23C 19/00
[52] U.S. Cl. ........................................ 426/582; 426/654
[58] Field of Search ................................. 426/582, 654, 426/321

[56] References Cited

U.S. PATENT DOCUMENTS

| | | | |
|---|---|---|---|
| 4,568,555 | 2/1986 | Spanier | 426/582 |
| 5,244,687 | 9/1993 | Rybinski et al. | 426/582 |
| 5,320,860 | 6/1994 | Duval et al. | 426/582 |

FOREIGN PATENT DOCUMENTS

WO 98095  3/1998  WIPO .

OTHER PUBLICATIONS

Growth of Proteolytic Clostridium botulinum in Process Cheese Products: 1. Data Acquisition for Modeling the Influence of pH, Sodium Chloride, Emulsifying Salts, Fat Dry Basis, and Temperature. Pieter F. Ter Steeg, Henk G. A.M. Cuppers, Johan C. Hellemons, and Guus Rijke, Journal of Food Protection, vol. 58, Oct. 1995.

Evaluation of Factors Involved in Antibotulinal Properties of Pasteurized Process Cheese Spreads. N. Tanaka, E. Traisman, P. Plantinga, L. Finn, W. Flom, L. Meske, and J. Guggisberg. Journal of Food Protection, vol 49, Jul. 1986.

Development of an Intermediate–Moisture Processed Cheese Food Product. H. Leung, H.A. Morris, A.E. Sloan, and T.P. Labuza.

*Primary Examiner*—Nina Bhat
*Attorney, Agent, or Firm*—Reinhart, Boerner, Van Deuren, Norris & Rieselbach, s.c.

[57] ABSTRACT

A shelf-stable cheese with a low-water activity, and method of preparation. The resulting shelf-stable cheese/composition does not require refrigeration and does not support the proliferation of microorganisms. It can be prepared as suitable for baking applications and/or a consistency appropriate for the desired food product.

21 Claims, No Drawings

LOW-WATER ACTIVITY CHEESE AND METHOD OF PREPARATION

The present invention relates to a low-water activity cheese and, more specifically, to such a cheese product shelf-stable at ambient temperature without refrigeration.

Cheese and cheese products are highly nutritious and popular in a variety of prepared foods and snack items. Several categories of hard, semi-soft and soft cheeses exist. Natural cheeses, i.e., Cheddar, Mozzarella, Romano, Blue, Parmesan, Cream and the like, are produced without further processing or adding other ingredients, while pasteurized processed cheese, i.e., American, spread and the like, entails further addition of ingredients and pasteurization. The aforementioned cheeses have standard compositional identities. On the other hand, cheese substitutes and cheese analogs, made from either dairy and/or non-dairy ingredients, have no such standard identities. If a cheese does not comply with a standard identity and contains essentially similar components to a standard cheese, but chemical and/or physical properties (i.e. % fat, % moisture) exist outside common levels, the cheese may be referred to as cheese product.

Typically, cheese is not shelf stable at room temperature, and requires special packaging and refrigeration during all phases of shipping, handling and marketing. Otherwise, spoilage will take place. Such rigid and exacting requirements during packaging and refrigeration limits the scope in which cheese can be utilized, particularly in industrial applications where many production facilities may lack refrigerated storage space. Furthermore, such a strict requirement for refrigeration limits distribution of cheese and related products in under-developed and developing countries where refrigeration facilities are not commonplace. Further limitations exist where storage precludes effective refrigeration.

The response to aforementioned problems have taken various approaches. For instance, retorted products require no pre-use refrigeration, but such products must remain inside hermetically sealed containers, thus limiting utilization in baking and snack applications. In any event, refrigeration is essential after opening the container in order to avoid spoilage.

Other approaches can be found in the prior art. Tanaka, et al., in the Journal of Food Protection, 1986, 49, 526–531, reported on known routes to high-moisture, low-acid cheese. As described therein, adjusting critical factors such as the concentration of emulsifiers, sodium chloride, moisture, along with manipulating the finished cheese pH, provides a high-water activity, shelf-stable cheese that does not support the growth and toxin production by *Clostridium botulinum*. The water activity (Aw) in most cheese compositions evaluated ranged from 0.920 to 1.00. Such high water activity limits the shelf stability, as well as potential use of such cheese in baked goods.

In general as the water activity of a given food product decreases, its shelf life increases. A high water activity product becomes more susceptible to mold, fungus and bacterial proliferation, accounting for these findings. Therefore the United States Food and Drug Administration (FDA) defines a food product with a pH of greater than 4.6 as shelf stable only if it has a water activity of 0.85 or below. The term "water activity level" is described by Norman N. Potter in the book "Food Science," Third Edition, A.V.I. (1984) as a qualitative measure of unbound free water in a system that is available to support biological and chemical reactions. Two foods with the same water content can vary significantly in their water activity depending on how much free water is in the system. When a food is in moisture equilibrium with its environment, the water activity of the food will be quantitatively equal to the relative humidity in head space of the container divided by 100. If the water activity of a food product is high, refrigeration will invariably be required during the handling and storage of the product.

U.S. Pat. No. 5,670,197, discloses a high-moisture, high-pH cheese spread containing cheese, water sufficient to provide a total moisture of from 51% to 58% and a pH from 5.3 to 6.0. The cheese is preserved by adding sodium chloride, a phosphate salt, sodium citrate, and sodium lactate in sufficient amounts to maintain the composition free from the growth of Clostridium botulinum and the production of toxin by those organisms during room temperature storage. Some embodiments contain about 1 to 2% sodium lactate for the sole purpose of inhibiting the growth of Clostridium botulinum. The patent failed to address, however, the issue of controlling the water activity of the cheese in order to avoid post-production contamination with other pathogens such as *Staphylococcus areus*. The shelf stability of such a processed cheese spread upon opening the package is questionable due to high water content. Likewise, the suitability of such cheese spread for baking applications would also be a concern.

U.S. Pat. No. 5,059,433 describes a process for preparing a cheese sauce that includes 5 to 15% cheese and 70 to 85% water. Due to the high water content of the sauce, refrigeration is also required once a package is opened.

Other attempts to produce a processed cheese food product were described by Leung, et al., in Food Technology, 1976, 30, 42–44. Therein, dried skim-milk (up to about 24% and including about 50% lactose) and propylene glycol (up to about 4.5%) were added to Cheddar cheese. Even though the cheeses prepared had intermediate moisture contents, Aw=0.82–0.83, storage for four months at room temperature caused the texture of the products to become harder and drier. At the high lactose concentrations used, crystallization occurred at lower temperatures. In addition, it is well-known that incorporating propylene glycol at such high levels adversely affects the palatability of the resulting cheese.

*Staphylococcus areus* is one of the most health threatening bacteria in food products. Even though the bacteria do not survive pasteurization, enterotoxins produced by those strains do not get destroyed posing serious health threats. Post-production contamination is a possible threat. The bacteria tolerate high levels of salt as well as low-water activity. Roedel, et. al., Mitteilungsblatt der Bundesanstalt fuer Fleischforschung, (1983), 82:5707–5714 studied five strains of *Staphylococcus areus*, and eight strains of Salmonella spp.; regarding capability to multiply in solutions adjusted to water activity of a range of 0.861 to 0.961 with salt, glycerol or sodium lactate. Limiting water activity for multiplication of *Staphylococcus areus* were: with glycerol 0.884 to 0.890, with salt 0.861 to 0.870, and with sodium lactate 0.920 to 0.943. Corresponding ranges for Salmonella spp. were: with glycerol 0.918 to 0.923, with salt 0.942 to 0.950, and with sodium lactate 0.943 to 0.951.

Clostridium is also a concern. If the water activity of a given processed cheese stored at room temperature is not controlled precisely, outgrowth of *Clostridium botulinum* (which spores survive pasteurization temperature) may occur, producing a powerful toxin which affects the nervous system. Ter Steeg, et al., Journal of Protection, 1995, 58, 1091–1099, found out that outgrowth occurred at 25C with a water-activity of 0.96 and at pH's greater than 5.7. While lower pH's inhibit bacterial growth and proliferation, such an acid content tends to promote fat separation and compromises overall shelf stability.

Most of the processes and technologies developed to date fail to adequately address the pertinent issues regarding food safety and post-production contamination. For instance, retorted cheese products, as well as the cheeses developed as summarized in the Ter Steeg and Tanaka research, support post-production contamination with health threatening microorganisms. Almost without exception, refrigeration after purchase opening is essential, because when exposed to air, cheese is highly prone to deterioration and spoilage.

In summary, there are a considerable number of deficiencies and problems relating to cheese products and compositions of the prior art. As discussed above, most such problems and deficiencies relate to shelf-stability and can be attributed to the cheese composition and/or the method by which it is prepared. There is a need for cheese, cheese products and/or cheese compositions meeting various criteria, including the following: (1) low-water activity in order to satisfy food safety measures; (2) a controlled free water level, especially for the baking and snack industries since the free water in cheese may contribute to softening of the finished product; (3) an appropriate consistency for the desired food product; (4) non-separation of fat or oil during all phases of processing and handling, and subsequent storage or use; and (5) acceptable organolyptic characteristics, i.e. body and texture, flavor; as well as appearance and color.

OBJECTS OF THE INVENTION

It is, therefore, an object of this invention to overcome the problems and deficiencies of the prior art, including those above, and/or to provide a cheese, cheese product and/or cheese composition having, among other attributes, those meeting the criteria stated above.

It can also be an object of the present invention to provide a method for manufacturing a cheese with low-water activity, for extended shelf life.

It is another object of the present invention to introduce a shelf-stable cheese with low-water activity, suitable for industrial application, and without fat separation or water migration into the finished food product, and a method for its preparation.

It is a further object of the current invention to provide a cheese that does not support the proliferation of food pathogens, during prolonged storage and without refrigeration.

It is another object of the present invention to provide a shelf-stable, low-water activity processed cheese that retains good taste and appearance qualities after heat treatment during preparation.

Other objects, features and advantages of the present invention will be apparent from the following summary and description of preferred embodiments, and will be readily apparent to those skilled in the art having knowledge of cheese, cheese products and various methods for their preparation. Such objects, features, benefits and advantages will be apparent from the above as taken in conjunction with the accompanying examples, tables, data and all reasonable inferences to be drawn therefrom.

It will be understood by those skilled in the art that one or more aspects of this invention can meet certain objectives, while one or more other aspects can meet certain other objectives. Each objective may not apply equally, in all instances, to every aspect of the present invention. As such, the following objects—in light of the prior art regarding cheese and methods of preparation—can be viewed in the alternative with respect to any one aspect of the present invention.

SUMMARY OF THE INVENTION

In part, the present invention is a cheese composition, including (1) about 40.0 wt. % to about 70.0 wt. % natural cheese; (2) about 1.0 wt. % to about 10.0 wt. % saccharide; and (3) about 2.0 wt. % to about 15.0 wt. % humectant. In preferred embodiments, the humectant can be but is not limited to sodium, potassium, magnesium and calcium lactate salts and combinations thereof Likewise, in preferred embodiments, the saccharide component is selected from the group consisting of mono-, di- and polysaccharides and combinations thereof.

In highly preferred embodiments of such a cheese composition, the humectant component is present in an amount sufficient to provide a water activity level less than about 0.87. Regardless, such a saccharide component can be used in conjunction with another humectant, such as, but not limited to, glycerin, propylene glycol, sorbitol and/or combinations of humectant.

In part, the present invention is also a shelf-stable cheese, including: (1) about 40.0 wt. % to about 70.0 wt. % natural cheese, (2) about 5.0 wt. % to about 15.0 wt. % humectant, and (3) an emulsifier. When formulated and prepared in accordance with this invention, such a cheese can have a water activity less than 0.86. The benefits of shelf-stability can be realized using such an emulsifier present in an amount sufficient to provide a pH between about 5.7 and about 6.5. While various commercially-available, food grade emulsifiers can be used, preferred embodiments of this invention utilize, without limitation, monophosphates, diphosphates, triphosphates, polyphosphates, citrates and combinations thereof. In highly-preferred embodiments, regardless of the emulsifier utilized, the pH is between about 5.8 and about 6.2.

In part, the present invention is also a cheese composition, including about 40.0 wt. % to about 70.0 wt. % natural cheese, and about 5.0 wt. % to about 15.0 wt. % humectant. Without limitation, preferred embodiments can also include a humectant such as one or more food quality lactate salts. Likewise, in preferred embodiments, such a humectant can be present in an amount sufficient to provide a water activity less than about 0.87.

In part, the present invention is also a method of using a saccharide to prepare a shelf-stable cheese product, having a water activity less than 0.86. Such a method includes: (1) providing natural cheese and blending therewith a saccharide in an amount of about 1.0 wt. % to about 10.0 wt. % of the cheese product, and (2) incorporating into the blend a humectant in an amount of about 2.0 wt. % to about 15.0 wt. % of the cheese product. As mentioned above and described more fully below, the saccharide component of this inventive method can be but is not limited to one or more mono-, di-, or polysaccharides and combinations of such saccharides. Regardless of the saccharide used, the humectant used with this method can be one of various commercially-available edible food quality humectants, or a combination of such humectants.

In part, the present invention is also a method of preparing a shelf-stable cheese. Such a method includes: (1) providing a natural cheese, (2) mixing the cheese with an emulsifier in an amount sufficient to provide a pH of about 5.7 to about 6.5, and (3) incorporating into the mixture a humectant in an amount sufficient to provide a predetermined water activity level. In preferred embodiments, the water activity level is such that the resulting cheese meets the various criteria of shelf-stability, as further discussed herein. In preferred embodiments, a pH of about 5.8 to about 6.2 is provided; likewise, the humectant and amount utilized provides a water activity level of less than about 0.87. As discussed more fully above, any food-quality humectant can be used, but particular advantages are obtained through the use of edible lactate salts and/or combinations thereof.

As mentioned above and described more fully below, it has been discovered that a water activity of about or below 0.87 in a processed cheese product is attainable if the appropriate humectants and carbohydrates are employed. In particular, and without limitation, it has been discovered through this invention that increased amounts of lactate salts and/or glycerin as humectants will control the water activity without adversely affecting the flavor of the finished product, even if heated during processing.

A desirable aspect of stability in the context of this invention, is the non-separation of the fat/oil component of the cheese. While not required to prevent separation or attain other attributes of this invention, certain advantages are realized if the amount of fat present in the low-water activity cheese product is to be limited to be about 27 wt. % or lower, and preferably under 23 wt. %, in order to prevent separation during manufacturing as well as subsequent handling and utilization. Control of pH is also found beneficial in order to prevent fat separation, both during preparation and subsequent use.

DETAILED DESCRIPTION OF THE INVENTION

The invention summarized above is more particularly described below and in the following examples. Both the descriptions and examples are intended as illustrations only, as numerous modifications and variations consistent with this invention will be apparent to those skilled in the art having knowledge of it.

Cheddar cheese or other natural cheeses such as Monterey Jack, Colby, Mozzarella, Romano, Parmesan, Cream, and or Skim-milk cheeses may be utilized separately or combined as the cheese component herein. Such cheeses can be considered separately as part of a more general group of suitable proteinaceous materials including but not limited to milk casein, plant proteins and the like, which may also be employed according to the present invention. Plant proteins can, for instance, include soy and wheat proteins. However, milk casein is less advantageous than cheese caseins for reasons relating to protein structure and composition. Dried milk powders are therefore less than preferred. In addition, such powders typically contain about 50% lactose, which imparts to the cheese a grainy mouthfeel and often crystallizes out of the cheese at lower temperatures at such concentrations. The present invention provides a route by which to avoid such deficiencies. Nonetheless, the amount of the natural cheese component ranges between 40 and 70%, preferably about 50 to 60%, as a mechanism to control the moisture content and, consequently, the water activity. Varying amounts of other suitable proteinaceous materials can be used consistent with this discussion and/or as supplemented with a suitable amount of fat or oil component, as desired for a particular cheese composition. Furthermore, if the cheese component is too high, fat separation becomes problematic during manufacturing and/or during further processing or use. For this reason, the amount of natural cheese and/or a suitable proteinaceous material can also be used to control fat content and impart an additional degree of stability.

Carbohydrates, especially sugars, can be used to reduce the water activity, but quantities used are limited due to increased sweetness imparted to the cheese product. Lactose is less sweet than dextrose which is in turn less sweet than sucrose. One such approach is to blend two or more sugars, such as dextrose, sucrose and lactose, to obtain an acceptable taste. The amount of lactose varies and when used can range from 2–7 wt. %. Similar ranges can be used for other such saccharides, depending upon the sweetness desired in the cheese composition. Whey solids and whey protein concentrates may also be used. When dextrose is used, the amount typically ranges between 1 to 7 %, preferably between 2 to 3 %. Low dextrose equivalent maltodextrins may also be incorporated.

Suitable inorganic emulsifiers may be selected from any edible or food grade products, including without limitation: phosphates, citrates, hexametaphosephates, aluminum phosphates, pyrophosphates. The appropriate emulsifier can be used to control pH of the cheese products and consequently prevent fat separation. The amount used is dependent upon the specified emulsifier used and the pH desired. Organic emulsifiers can also be used and include without limitation lecithin, mono-glycerides, di-glycerides, and sodium stearoyl lactylate. Again, all are observed to reduce or inhibit fat separation. For instance, sodium stearoyl lactate was found to be a very effective agent in the current invention when added to the cheese mix at 0.1 to 0.2 %, preferably at 0.2%.

Several gums and stabilizers can also be incorporated into the cheese of this invention. Guar gum, xanthan gum, carrageenans, pectin, gum arabic, carboxy methyl cellulose, are a few of the suitable stabilizers. Gum arabic can be especially useful due to its water binding capabilities without significantly increasing the product viscosity. The amount of stabilizer may range from 0.05 to 1.2%, preferably around 0.5 to 0.7%. Starches, modified food starches, complex carbohydrates, and various fibers may also be incorporated based on the desired finished product.

As evidenced from numerous examples which follow, natural flavors as well as artificial flavors and flavoring agents may be added in various combinations and levels to suit taste and perspective application.

Utilizing the appropriate humectants, in accordance with this invention, helps control the water activity, prevents off flavors and excessive sweetness, along with enhancing the flowability of the finished cheese products. Edible, food grade lactate salts are suitable for use because they bind free water, inhibit pathogenic organisms, lower water activity, maintain flowability, add only a slight salty background which is indigenous to cheese. Such humectants do not significantly alter cheese pH, do not impart sweetness, and contribute to ease of processing during manufacturing. The amount of such lactates ranges from about 2.0 to 15.0%, and may be added separately or combined with other humectants. Other suitable humectants to be incorporated in conjunction with lactates include glycerin, propylene glycol, and/or sorbitol.

A dilemma is that binding free water may also contribute to fat separation and dry consistency. The present invention circumvents that problem by allowing merely sufficient water to support the resulting emulsion without fat separation. The flowability and processability of the product are also maintained. In contrast, addition of fillers and other solids may promote fat separation out of emulsion during processing as well as during later handling or storage. Incorporating humectants, such as sodium or potassium lactate in conjunction with additional humectants such as glycerin, propylene glycol, and sorbitol help maintain flowability and processability of the product. Particle size reduction can also contribute toward various physical attributes, including non-separation. Numerous known methods of particle size reduction may be employed such as homogenization, sheering, etc. of the cheese product/composition.

With respect to either the methods, compositions or products of the present invention, the various emulsifiers, saccharides, humectants and proteins can comprise, consist of, or consist essentially of the aforementioned ingredients, components or materials, whether or not in the amounts or concentrations expressed. Each such emulsifier, saccharide, humectant, or protein is compositionally distinguishable, characteristically contrasted, and can be practiced in conjunction with the present invention separate and apart from any other such component, ingredient or material. Accordingly, it should be understood that the inventive methods and/or compositions, as illustratively disclosed herein, can be practiced or utilized in the absence of any one component, ingredient, material and/or step, which may or may not be disclosed, referenced or inferred herein, the absence of which may or may not be specifically disclosed, referenced or inferred herein.

With regard to the method of this invention, an initial step in making shelf-stable, low-water activity cheese can be to blend natural cheese, together with any, if desired, stabilizers, salt, flavorings, sugars, sorbic acid, colors and water. The mixture is transferred to a process cheese cooker where one or more emulsifiers are added. The cheese mixture is heated to about 175–185F, before one or more humectants are incorporated. The cheese is then transferred into suitable packaging, and cooled.

EXAMPLES OF THE INVENTION

The following non-limiting examples and data illustrate various aspects and features relating to the inventive compositions, cheese products and/or methods described herein, including the surprising and unexpected results obtained through use of such humectants, carbohydrates, and/or emulsifiers in providing a low water activity, shelf-stable cheese at a pH which reduces or inhibits fat/oil separation.

The measurement of water activity was determined using AQUA LAB CX-2 water activity meter (Decagon Devices, Inc.). Fat, moisture, and pH values were determined using standard laboratory instruments. The heat stability of the product can be evaluated using a simple procedure such as incubating the cheese at about 160 to 180F for various durations. Unless otherwise indicated, both below and with regard to the previous discussion, all component percentages/concentrations are in terms of weight percent.

Example 1

A shelf-stable process cheese product lower in water activity than conventional processed cheese, which usually has an Aw of 0.92–1.00, was formulated as follows:

| Ingredient | Weight percentage |
|---|---|
| Mild Cheddar cheese | 66.30 |
| Skim-milk cheese powder | 1.00 |
| Process cheese rework | 2.00 |
| Disodium phosphate | 2.20 |
| Sodium citrate | 0.40 |
| Sorbic acid | 0.20 |
| Salt | 1.40 |
| Sweet Whey | 2.50 |
| Sodium Hexametaphosphate | 0.20 |
| Xanthan Gum | 0.10 |
| Sodium lactate | 5.00 |
| Glycerin | 3.00 |
| Natural cheese flavor | 3.60 |
| Mono and diglycerides | 0.20 |
| Cheese color | 0.08 |
| Vegetable shortening | 2.68 |
| Water | 9.14 |

One thousand grams of this formulation was processed in an experimental processed cheese cooker. The water activity of the resultant cheese product was 0.870. Other physical parameters were: fat, 26.14% and moisture, 39.0%. Despite the acceptable and relatively low moisture level, the product showed signs of fat separation, and the water activity was slightly higher than the pertinent FDA required level of about or below 0.85, a further reduction in water activity was necessary.

Example 2

In order to further increase the stability of the processed cheese product, the amount of natural Cheddar cheese was reduced, as follows:

| Ingredient | Weight percentage |
|---|---|
| Mild Cheddar cheese | 63.81 |
| Skim-milk cheese powder | 1.00 |
| Process cheese rework | 2.00 |
| Disodium phosphate | 2.40 |
| Sodium citrate | 0.40 |
| Sorbic acid | 0.20 |
| Salt | 1.20 |
| Sweet Whey | 2.61 |
| Sodium Hexametaphosphate | 0.20 |
| Xanthan Gum | 0.20 |
| Sodium lactate | 4.00 |
| Glycerin | 2.00 |
| Natural cheese flavor | 4.64 |
| Mono and diglycerides | 0.20 |
| Cheese color | 0.08 |
| Butter oil | 3.20 |
| Citric acid | 0.08 |
| Water | 11.78 |

One thousand grams of this formulation was processed in an experimental processed cheese cooker. The water activity of the resultant cheese product was 0.865. Other physical parameters were: fat, 26.82%, and moisture, 40.0%. Some fat separation was observed during processing.

Example 3

In order to further reduce the water activity of the process cheese product without causing fat separation, an increased amount of glycerin with no added sodium lactate was evaluated, as follows:

| Ingredient | Weight percentage |
| --- | --- |
| Mild Cheddar cheese | 63.65 |
| Process cheese rework | 2.00 |
| Disodium phosphate | 2.40 |
| Sodium citrate | 0.40 |
| Sorbic acid | 0.20 |
| Salt | 1.30 |
| Sweet Whey | 3.61 |
| Sodium Hexametaphosphate | 0.15 |
| Xanthan Gum | 0.20 |
| Glycerin | 5.40 |
| Natural cheese flavor | 4.64 |
| Mono and diglycerides | 0.20 |
| Cheese color | 0.08 |
| Buffer oil | 3.20 |
| Citric acid | 0.08 |
| Lactic acid | 0.25 |
| Water | 12.24 |

One thousand grams of this formulation was processed in an experimental processed cheese cooker. The water activity of the resultant cheese product was 0.860. Other physical parameters were: fat, 26.77%, moisture, 39.30% and pH 5.63. The cheese product showed some signs of fat separation and had a sweet taste, as compared to the product/composition of Example 3.

Example 4

In an attempt to further reduce the water activity of the shelf-stable processed cheese product without causing fat separation, an increased amount of sodium lactate with no added glycerin was evaluated, as follows:

| Ingredient | Weight percentage |
| --- | --- |
| Mild Cheddar cheese | 63.54 |
| Process cheese rework | 2.00 |
| Disodium phosphate | 2.40 |
| Sodium citrate | 0.40 |
| Sorbic acid | 0.20 |
| Salt | 1.30 |
| Sweet Whey | 3.61 |
| Sodium Hexametaphosphate | 0.15 |
| Xanthan Gum | 0.20 |
| sodium lactate | 9.00 |
| Natural cheese flavor | 4.64 |
| Mono and diglycerides | 0.20 |
| Cheese color | 0.08 |
| Butter oil | 3.20 |
| Citric acid | 0.08 |
| Lactic acid | 0.25 |
| Water | 8.75 |

One thousand grams of this formulation was processed in an experimental processed cheese cooker. The water activity of the resultant cheese product was 0.857. Other physical parameters were: fat, 26.73%, moisture, 40.00% and pH 5.73. The cheese product also showed signs of fat separation.

Example 5

In order to further reduce the water activity of the shelf-stable processed cheese product without causing fat separation, another humectant, sorbitol, was evaluated in the following formulation:

| Ingredient | Weight percentage |
| --- | --- |
| Mild Cheddar cheese | 67.46 |
| Process cheese rework | 2.00 |
| Disodium phosphate | 2.40 |
| Sodium citrate | 0.40 |
| Sorbic acid | 0.20 |
| Salt | 1.40 |
| Sweet Whey | 3.88 |
| Sodium Hexametaphosphate | 0.15 |
| Xanthan Gum | 0.20 |
| Sorbitol solution | 7.71 |
| Natural cheese flavor | 4.64 |
| Mono and diglycerides | 0.25 |
| Lecithin | 0.15 |
| Cheese color | 0.08 |
| Citric acid | 0.08 |
| Lactic acid | 0.25 |
| Water | 8.75 |

One thousand grams of this formulation was processed in an experimental processed cheese cooker. The water activity of the resultant cheese product was 0.867. Other physical parameters were: fat, 25.03%, moisture, 39.08% and pH 5.70. The cheese product showed some sign of fat separation.

Example 6

As described above, the amount of natural cheese can reduce fat content and separation. Therefore, following formulation was evaluated:

| Ingredient | Weight percentage |
| --- | --- |
| Mild Cheddar cheese | 47.00 |
| Process cheese rework | 2.00 |
| Disodium phosphate | 2.60 |
| JOHA S9 Emulsifier | 0.20 |
| Sorbic acid | 0.20 |
| Salt | 1.60 |
| Sweet Whey | 5.00 |
| Skim-milk cheese powder | 6.80 |
| Whey protein concentrate | 3.00 |
| Sodium Hexametaphosphate | 0.10 |
| Xanthan Gum | 0.20 |
| Sodium lactate | 9.00 |
| Natural cheese flavor | 7.64 |
| Mono and diglycerides | 0.50 |
| Lecithin | 0.30 |
| Cheese color | 0.08 |
| Citric acid | 0.08 |
| Lactic acid | 0.20 |
| Water | 13.50 |

One thousand grams of this formulation was processed in an experimental processed cheese cooker. The water activity of the resultant cheese product was 0.866. Other physical parameters were: fat, 20.62%, moisture, 39.50%. The cheese product still showed some sign of fat separation.

Example 7

Rennet casein was used as a protein source for the shelf-stable, low-water activity processed cheese product. The formulation was carried out as follows:

| Ingredient | Weight percentage |
| --- | --- |
| Rennet casein | 22.10 |
| Partially hydrogenated oil | 23.78 |
| Disodium phosphate | 2.40 |
| Sodium citrate | 0.40 |
| Sorbic acid | 0.20 |
| Salt | 1.40 |
| Sweet Whey | 5.08 |
| Sodium Hexametaphosphate | 0.15 |
| Xanthan Gum | 0.20 |
| Sodium lactate | 8.00 |
| Natural cheese flavor | 6.64 |
| Mono and diglycerides | 0.25 |
| Lecithin | 0.15 |
| Cheese color | 0.08 |
| Citric acid | 0.08 |
| Lactic acid | 0.25 |
| Water | 28.84 |

One thousand grams of this formulation was processed in an experimental processed cheese cooker. The physical parameters were: fat, 25.78%, moisture, 35.08%.

Example 8

Soy protein isolates were investigated as protein sources for the shelf-stable, low-water activity processed cheese product. The formulation was carried out as follows:

| Ingredient | Weight percentage |
| --- | --- |
| Soy protein isolates | 20.10 |
| Partially hydrogenated oil | 22.78 |
| Disodium phosphate | 2.40 |
| Sodium citrate | 0.40 |
| Sorbic acid | 0.20 |
| Salt | 1.40 |
| Sweet Whey | 5.08 |
| Sodium Hexametaphosphate | 0.15 |
| Xanthan Gum | 0.20 |
| Sodium lactate | 8.00 |
| Natural cheese flavor | 6.64 |
| Mono and diglycerides | 0.25 |
| Lecithin | 0.15 |
| Cheese color | 0.08 |
| Citric acid | 0.08 |
| Lactic acid | 0.25 |
| Water | 31.84 |

One thousand grams of this formulation was processed in an experimental processed cheese cooker. The physical parameters were: fat, 24.18%, moisture, 34.35%.

Example 9

In order to further reduce the water activity of the processed cheese product without causing fat separation, another humectant, propylene glycol, in addition to sodium lactate, was evaluated in the following formulation:

| Ingredient | Weight percentage |
| --- | --- |
| Mild Cheddar cheese | 61.90 |
| Process cheese rework | 2.00 |
| Disodium phosphate | 2.40 |
| JOHA S9 Emulsifier | 0.20 |
| Sorbic acid | 0.20 |
| Salt | 1.60 |
| Sweet Whey | 5.00 |
| Non-fat dry milk | 4.40 |
| Carrageenan | 0.20 |
| Propylene Glycol | 3.50 |
| Sodium lactate | 6.00 |
| Natural cheese flavor | 4.14 |
| Mono and diglycerides | 0.60 |
| Lecithin | 0.20 |
| Cheese color | 0.08 |
| Citric acid | 0.08 |
| Lactic acid | 0.25 |
| Water | 7.25 |

While propylene glycol imparted a slightly unpleasant flavor to the processed cheese product, the water activity was an acceptable 0.872.

Example 10

Five hundred pounds of shelf-stable, low-water activity processed cheese product was produced in a direct steam injection processed cheese cooker utilizing the following ingredients:

| Ingredient | Weight percentage |
| --- | --- |
| Mild Cheddar cheese | 56.71 |
| Process cheese rework | 2.00 |
| Disodium phosphate | 1.00 |
| Sodium aluminum phosphate | 1.70 |
| Sorbic acid | 0.20 |
| Salt | 0.80 |
| Gum Arabic | 0.60 |
| Dextrose | 3.00 |
| Lactose | 3.50 |
| Potassium lactate | 8.50 |
| Glycerin | 3.30 |
| Natural cheese flavor | 6.25 |
| Mono and diglycerides | 0.20 |
| Sodium stearoyl lactylate | 0.20 |
| Cheese color | 0.08 |
| Water | 11.96 |

The water activity was about 0.855. The processed cheese product contained 21.65% fat, and 40.89% moisture, and had a pH of 6.00. No fat separation was noticed during processing or further handling of the cheese product. Upon further evaluation of the shelf-stable, low-water activity processed cheese product, it performed well in various baked goods and exhibited good flavor characteristics.

Example 11

The same procedure of example 10 was followed except a homogenizer (Crepaco) was utilized to reduce particle size and produce a smooth shelf-stable product with increased stability towards fat separation.

Example 12

The same procedure of example 10 was followed except a standard shear pump was utilized to reduce particle size and produce a smooth shelf-stable product with increased stability towards fat separation.

Example 13

Five hundred pounds of shelf-stable, low-water activity processed cheese product was produced in a direct steam injection processed cheese cooker utilizing the following ingredients:

| Ingredient | Weight percentage |
| --- | --- |
| Mild Cheddar cheese | 59.10 |
| Skim-milk Cheese Powder | 1.65 |
| Disodium phosphate | 2.20 |
| Trisodium phosphate | 0.80 |
| Sorbic acid | 0.20 |
| Salt | 0.80 |
| Gum Arabic | 0.60 |
| Dextrose | 3.00 |
| Lactose | 4.00 |
| Sodium lactate | 8.50 |
| Glycerin | 3.00 |
| Natural cheese flavor | 6.25 |
| Mono and diglycerides | 0.20 |
| Sodium stearoyl lactylate | 0.20 |
| Cheese color | 0.08 |
| Water | 9.42 |

The resulting cheese was homogenized at a pressure of about 500–600 psi. The water activity was within the acceptable limit, 0.826. The processed cheese product contained 21.83% fat, and 38.10% moisture, and had a pH of 5.95. No fat separation was noticed during processing or further handling of the cheese product. Upon further evaluation of the shelf-stable, low-water activity processed cheese product, it performed well in various baked goods and exhibited favorable flavor characteristics.

Example 14

Two pounds of shelf-stable, low-water activity processed Cream cheese product was produced in a direct steam injection processed cheese cooker utilizing the following ingredients:

| Ingredient | Weight percentage |
| --- | --- |
| Cream cheese | 59.10 |
| Skim-milk Cheese Powder | 1.65 |
| Disodium phosphate | 1.70 |
| Trisodium phosphate | 1.30 |
| Sorbic acid | 0.20 |
| Salt | 0.50 |
| Gum Arabic | 0.60 |
| Dextrose | 10.00 |
| Lactose | 4.00 |
| Sodium lactate | 4.00 |
| Glycerin | 8.00 |
| Natural Cream cheese flavor | 2.25 |
| Mono and diglycendes | 0.20 |
| Sodium stearoyl lactylate | 0.20 |
| Water | 6.30 |

The resulting cheese was homogenized at a pressure of about less than 1000 psi. The water activity was within the acceptable limit, 0.848.

While the principals of this invention have been described in connection with specific embodiments, it should be understood clearly that these descriptions, along with the chosen tables and data therein, are made only by way of example and are not intended to limit the scope of this invention, in any fashion. For example, as compared to the prior art, the compositional parameters of the present invention can be modified as described herein, as a further basis for distinction over the prior art. In addition, many of the ingredients or components specified in the preceding examples are present and/or utilized to optimize various qualities and characteristics as they may apply to taste, appearance and/or end use application. However, it should be understood that other such qualities and characteristics, such as low water activity, shelf stability, and non-separation, can be achieved as more broadly described herein, without such specified components or ingredients. Other advantages and features of this invention will become apparent from the following claims, with the scope thereof determined by the reasonable equivalence, as understood by those skilled in the art.

We claim:

1. A cheese composition, comprising: about 40.0 wt. percent to about 70.0 wt. percent natural cheese; about 1.0 wt. percent to about 10.0 wt. percent lactose; and
about 2.0 wt. percent to about 15.0 wt. percent humectant.

2. The composition of claim 1 wherein said humectant is selected from the group consisting of sodium, potassium, magnesium and calcium lactate salts and combinations thereof.

3. The composition of claim 2 wherein said humectant is present in an amount sufficient to provide a water activity level less than about 0.87.

4. The composition of claim 3 further including a humectant selected from the group consisting of glycerin, propylene glycol, sorbitol and combinations thereof.

5. A solid shelf-stable cheese, comprising: about 40.0 wt. percent to about 70.0 wt. percent natural cheese; about 2.0 wt. percent to about 15.0 wt. percent humectant; and an emulsifier, such that said cheese has a water activity level less than 0.86.

6. The shelf-stable cheese of claim 5 wherein said emulsifier is present in an amount sufficient to provide a pH between about 5.7 and about 6.5.

7. The shelf-stable cheese of claim 6 wherein said emulsifier is selected from the group consisting of monophosphates, diphosphates, triphosphates, polyphosphates, citrates and combinations thereof.

8. The shelf-stable cheese of claim 6 wherein the pH is between about 5.8 and about 6.2.

9. A solid cheese composition, comprising about 40.0 wt. percent to about 70.0 wt. percent natural cheese about 5.0 wt. percent to about 15.0 wt. percent humectant, and a fat component, said component consisting essentially of said component indigenous to and provided by said natural cheese.

10. The composition of claim 9 wherein said humectant is selected from the group consisting of food quality lactate salts and combinations thereof.

11. The composition of claim 10 wherein said humectant is present in an amount sufficient to provide a water activity level of less than about 0.87.

12. A method of using lactose to prepare a shelf-stable cheese product having a water activity level less than 0.86, said method comprising:
providing natural cheese and blending therewith lactose in an amount of about 1.0 wt. percent to about 10.0 wt. percent of said cheese product; and
incorporating into said cheese and lactose blend a humectant in an amount of about 2.0 wt. percent to about 15.0 wt. percent of said cheese product.

13. The method of claim 12 wherein said saccharide is selected from the group consisting of mono-, di-, and polysaccharides and combinations thereof.

14. A method of preparing a temperature-stable cheese and shelf-stable cheese, said method comprising:
providing a proteinaceous material;
mixing with said material an emulsifier in an sufficient to provide a pH of about 5.6 to about 6.5;
incorporation with said mixture gum arabic in an amount sufficient to bind water without increasing the viscosity of said mixture; and incorporating with said mixture a humectant in an amount sufficient to provide a predetermined water activity level such that said cheese is shelf-stable and temperature stable.

15. The method of claim 14 wherein the pH is about 5.8 to about 6.2.

16. The method of claim 14 wherein the water activity level is less than about 0.87.

17. The method of claim 16 wherein said humectant is selected from the group consisting of food quality lactate salts and combinations thereof.

18. The method of claim 17 wherein said humectants are combined with additional humectants, said additional humectants selected from the group consisting of glycerin, propylene glycol, sorbitol and combinations thereof.

19. The method of claim 14 wherein said proteinaceous material is a casin.

20. The method of claim 14 wherein said proteinaceous material is a plant protein.

21. A cheese composition comprising:

a suitable proteinaceous material;

a humectant in an amount sufficient to provide a predetermined water activity level such that said cheese is shelf stable; and gum arabic in an amount sufficient to bind water without increasing viscosity.

* * * * *